(12) United States Patent
Chaoui

(10) Patent No.: US 10,549,307 B2
(45) Date of Patent: Feb. 4, 2020

(54) MULTI FUNCTION DUCTLESS FOLDING UTILITY ENCLOSURE

(71) Applicant: Sam Micheal Chaoui, Riverside, CA (US)

(72) Inventor: Sam Micheal Chaoui, Riverside, CA (US)

(73) Assignee: BAKING INNOVATIONS LLC, Riverside, CA (US)

( * ) Notice: Subject to any disclaimer, the term of this patent is extended or adjusted under 35 U.S.C. 154(b) by 245 days.

(21) Appl. No.: 15/455,280

(22) Filed: Mar. 10, 2017

(65) Prior Publication Data

US 2017/0333935 A1   Nov. 23, 2017

Related U.S. Application Data

(60) Provisional application No. 62/390,007, filed on Mar. 16, 2016.

(51) Int. Cl.
| | |
|---|---|
| *B05B 16/00* | (2018.01) |
| *B05B 3/02* | (2006.01) |
| *B01D 46/00* | (2006.01) |
| *F24F 13/28* | (2006.01) |
| *F24F 5/00* | (2006.01) |
| *B01D 39/06* | (2006.01) |
| *B08B 15/02* | (2006.01) |

(52) U.S. Cl.
CPC .............. *B05B 16/00* (2018.02); *B01D 39/06* (2013.01); *B01D 46/0002* (2013.01); *B01D 46/0035* (2013.01); *B01D 46/0039* (2013.01); *B05B 3/02* (2013.01); *B08B 15/02* (2013.01); *F24F 5/0035* (2013.01); *F24F 13/28* (2013.01); *B01D 2279/35* (2013.01); *B01D 2279/40* (2013.01); *F24F 2221/02* (2013.01); *F24F 2221/34* (2013.01)

(58) Field of Classification Search
CPC ................ B01D 39/06; B01D 46/0002; B01D 46/0035; B01D 46/0039; B01D 2279/35; B01D 2279/40; B05B 3/02; B05B 15/12; B05B 16/00; F24F 5/0035; F24F 2221/02; F24F 2221/34
USPC ............. 454/50–55, 63–65; 361/56; 118/326
See application file for complete search history.

(56) References Cited

U.S. PATENT DOCUMENTS

| | | | | |
|---|---|---|---|---|
| 2,085,390 | A | * | 6/1937 | Quinlivan ............. F24F 5/0035 261/104 |
| 2,694,466 | A | * | 11/1954 | Bingman ................ B05B 14/46 96/265 |
| 2,786,740 | A | * | 3/1957 | Taylor ...................... B25J 21/02 312/1 |
| 3,315,639 | A | * | 4/1967 | Close ...................... B05B 16/40 118/642 |

(Continued)

*Primary Examiner* — Joshua E Rodden

(57) ABSTRACT

The disclosure provides a multi-function ductless enclosure apparatus. Its main purpose is to be used as a paint spray booth to capture excess paint, pass it through filters with the use of a fan and then exhaust the ensuing clean air out, back into the room air. This booth is foldable and light weight and can be moved to a different location in minutes. It can also be transformed to serve many other applications with the use of a few accessories thereby saving the end user from having to have several booths (saving counter space) and also saving him from having to spend a lot of money buying many booths for different applications.

24 Claims, 16 Drawing Sheets

(56) References Cited

U.S. PATENT DOCUMENTS

| | | | | |
|---|---|---|---|---|
| 3,520,115 A * | 7/1970 | Bowen | B01D 46/12 55/422 |
| 4,303,417 A * | 12/1981 | Koch, II | B01D 46/10 95/268 |
| 4,760,951 A * | 8/1988 | MacGregor | B05B 16/40 229/125 |
| 5,145,496 A * | 9/1992 | Mellen | B01D 46/0046 55/302 |
| 5,279,631 A * | 1/1994 | Pingel | B05B 14/43 55/294 |
| 7,189,272 B2 * | 3/2007 | Cheng | B05B 16/80 55/385.2 |
| 7,455,580 B2 * | 11/2008 | Cheng | B05B 14/43 454/50 |
| 7,585,368 B2 * | 9/2009 | Lin | B05B 15/80 118/326 |
| 10,166,686 B1 * | 1/2019 | Dhanjal | B25J 21/02 |
| 2006/0213432 A1 * | 9/2006 | Lotterhos | B05B 16/00 118/31.5 |
| 2013/0017131 A1 * | 1/2013 | Galliher | C12M 37/00 422/544 |
| 2014/0235153 A1 * | 8/2014 | Rankin | B05B 16/60 454/63 |
| 2015/0209462 A1 * | 7/2015 | Turbett | B01D 46/0023 436/1 |
| 2017/0087499 A1 * | 3/2017 | Combs | B01D 46/0001 |
| 2018/0037343 A1 * | 2/2018 | Procyshyn | A61M 5/1782 |
| 2018/0280855 A1 * | 10/2018 | Sasaki | A61B 90/00 |

* cited by examiner

MULTI FUNCTION DUCTLESS FOLDING UTILITY ENCLOSURE

CROSS REFERENCE TO RELATED APPLICATIONS

This application claims the benefit of priority under 35 USC § 119(e) to U.S. Provisional Patent Application Ser. No. 62/390,007, filed on Mar. 16, 2016 and titled: "MULTI FUNCTION DUCTLESS FOLDING UTILITY ENCLOSURE," the entire disclosure of which is hereby incorporated by reference in its entirety for all purposes.

TECHNICAL FIELD OF THE INVENTION

The disclosure generally relates to multi-purpose enclosures, and more particularly, to a multi-functional ductless folding utility enclosure that can be easily converted for many different applications and can be folded flat into a small lightweight size for easy storage and transport.

BACKGROUND OF THE INVENTION

Many commercially available paint spray and fume hood enclosures lack convenience: they are too expensive, too big, too small, too heavy, ducted, impractical for a particular purpose, or don't exist in the market place for commercial and/or non-commercial uses.

Most commercially available paint spray and fume hood enclosures are rigidly constructed and are not made to be collapsible. That makes it difficult to store them away when not in use. They also take up valuable storage space when retailers wish to stock inventory in their warehouses. Additionally, their shipping cost can be very high because they take up too much space due to the amount of dead air contained within their opened structure.

Weight:
Additionally, many of the existing enclosures are made of metal which adds considerable weight (compared to this unit which is made of plastic) and makes it impractical if not impossible to easily carry and transport.

Size:
Many different sizes are available for commercially available enclosures for most applications but those that are targeted for the baking and craft industries are too small. It is not possible to fit a standard large cake or product to be air brushed or spray painted.

Materials:
The enclosures used by the baking industry are not made for that purpose. They are not manufactured in a clean environment and may be shipped contaminated. Additionally, they are not constructed with food safe materials. Additionally, those enclosures that are made and marketed for the food industry are not fully enclosed and present a risk for food contamination during their use.

Sealing:
The work chamber in most commercially available paint spray and fume hood enclosures cannot be sealed, which provides a path for contaminants to enter the work chamber. Some enclosure operations do not require an air flow vacuum at all. When shut off, the current commercially available enclosures do not provide a means of sealing the chamber from air drafts that can bring contaminants into the work chamber (during the paint drying, dehydration, dusting, incubation, color sorting or steaming operations).

Ducting:
Although some enclosures are ductless, many are ducted and cause inconvenience in having to conduct a hose out of a window or a door.

Lighting:
None of the commercially available baking paint spray and fume hood enclosures provide lighting.

Light Intensity Control:
None of the baking commercially available paint spray and fume hood enclosures provide lighting intensity control.

Remote Operation:
None of the commercially available Air Brushing or Paint spray and fume hood enclosures provide a remote control to control the light intensity.

High End Filters:
Most of the commercially available paint spray and fume hood enclosures booths that are not made for the baking industry are supplied with a pre-set filter package that includes a HEPA filter. They are designed and constructed specifically for fumes or aerosol paints that contain toxic Volatile Organic Compounds (VOCs). Some of the dust or paints used by the baking and other industries do not contain toxic materials or chemicals. Thus, the use of standard high filtration for removing toxic VOCs for baking applications unnecessarily adds cost to the consumer.

Contaminant and Carbon Filters:
None of the commercially available paint and fume enclosures made for the craft and baking industries in particular do not provide activated carbon filters which help eliminate or greatly reduce the presence of odors or flammable VOCs or contaminants into the work environment.

Turntable:
None of the commercially available paint spray and fume hood enclosures offer a turntable (manual or powered) to rotate the part being painted.

Hooks:
This enclosure will provide hooks to hang parts or equipment when no other paint spray or fume enclosures do.

This enclosure will provide Power or USB outlets to provide power to accessories and upgrades.

Power or USB outlets; or other accessories.

Multi Part Construct:
The commercially available enclosures have multiple piece construction which make it hard and time consuming to set up.

Adjustable Vacuum Air Flow:
Most commercially available paint spray and fume hood enclosures provide a single insufficient air flow suction setting of around of 220 Cubic Feet per Minute (CFM) or more but with no flow volume adjustment.

Heat Drying:
None of the commercially available paint and fume enclosures provide for heat drying and therefore no power switch, no heat intensity control, and no automatic shut off timer.

Humidification:
None of the commercially available paint and fume enclosures provide for an accessory that utilizes a wicking water filter (water soaked) through which air is drawn inside the enclosure to provide higher relative humidity (moisture). This allows the user to work on their cake fondant, paint or clay while it remains moist thereby preventing any surface cracking.

Cooling:
The above process of drawing moisture into the chamber creates through evaporative cooling, a drop-in temperature thereby allowing lower temperatures especially during warm or hot days preventing the work piece from excess softening or melting.

Air Flow Sensor:

Most commercially available paint spray and fume hood enclosures do not provide an air flow sensor to warn the user when the filters need replacing.

Clean Room:

In most commercially available paint spray and fume hood enclosures, the fans or blowers are not reversible and therefore, offer no clean room capability.

Drain:

Most commercially available paint spray and fume hood enclosures provide no liquid drains.

Noise:

Most commercially available paint spray and fume hood enclosures are noisy.

Single Enclosure:

Each industry that offers a paint spray and/or fume hood enclosure of some sort or another provides one for their particular specialty use. That puts a lot of different enclosures in the market place. End users with multiple needs have to purchase many different enclosure products and pay for each separately. Single function enclosures are costly to the end user and the environment. A single enclosure in the market can lack functionality of one or more of the following: paint spray; fume elimination; clean room; product heater; dryer; part long term conditioning and aging; dehydrator; hydrator; cooler; washout for photography; sand/bead blaster; black light (for hydrocarbon detection and inspection); photography backdrop; incubator (egg hatching and plant growing); color matching and sorting (multi light color sorting); color proof table; projection booth for use as a template; screen printer; and cutting.

Therefore, there remains a need in the art for a multi functional ductless folding utility enclosure that can be easily converted for many different applications.

SUMMARY OF THE INVENTION

The present disclosure seeks to overcome the foregoing disadvantages in an improved manner over commonly known paint spray and fume hood systems. The present disclosure provides a ductless enclosure apparatus for disposition in an ambient environment for containment of all paint and processes that generate toxic, flammable and noxious contaminants. More particularly, in accordance with the present invention, a ductless enclosure apparatus including a housing defining a work chamber, a filtration chamber, and an air circulation system is provided. Potentially contaminated air from the work chamber is driven by the air circulation system through the filter system of the filtration chamber, and from the filtration chamber through an exhaust outlet into the work environment. Passage of toxic, flammable or noxious contaminants from the work chamber into the work environment is thereby prevented. The ductless enclosure apparatus's main feature is the fact that it is foldable and thus, requires little space for storage. It is portable and light weight. It also provides a light with illumination intensity control via radio frequency or infrared remote control.

The other major feature of this ductless enclosure apparatus is its ability to be converted to serve many other purposes. The apparatus is a multi-functional ductless enclosure that can be used for many different applications. It can be used as a paint spray and fume removal enclosure (negative pressure), a medical assembly clean room (positive pressure), a dryer, a dehydrator, a hydrator, an incubator, a photography backdrop, a sand blaster, a sound recording booth, a black room for hydrocarbon inspection, a color matching and sorting enclosure, a part inspection by projection booth, an egg hatchery, a part inspection projection room, a washout room, a jeweler booth, and many others.

The ductless enclosure apparatus can be reversibly assembled. It erects and collapses flat by folding inward the top and bottom middle sections of the apparatus and takes up a small space of less than about 8 inches thick by about 28 inches wide and about 24 inches long. Other size models take up different footprints but are still very low in height (about 8 inches thick).

The ductless enclosure apparatus can be provided in multiple sizes to address different market needs with the smallest being larger than most commercially available units for the baking industry. For example, current units used for cake air brushing do not fit a standard size cake. They provide a work area that is too small and height that is too low. This enclosure is big enough to fit the largest common cake sizes at about 24 inches wide, 24 inches high, and 21 inches deep.

All surfaces of the ductless enclosure apparatus can be provided sanitary clean. If used for medical or food purposes, this enclosure can be shipped in a vacuum sealed bag that has been sealed and sterilized.

The work chamber of the ductless enclosure apparatus may not be air tight but can be manufactured with a tight fitting construction to minimize the introduction of contaminants from the work environment. The only gaps may be around the back door but are sealed with rubber gaskets (if and as required).

All construction materials such as plastic or stainless steel were selected for the ductless enclosure apparatus in order for it to be food safe.

The enclosure uses 12 Volts Direct Current (VDC) for power which makes it safer than units that use 110 or 240 Volts Alternating Current (VAC).

The ductless enclosure apparatus can be provided with different filter packages to fit the specific application, thereby reducing the cost of the enclosure for certain applications.

As necessary and required by the specific application, the ductless enclosure apparatus can be equipped with different MERV rated filters, a high efficiency Particulate Arrestance (HEPA) filter (removes 99.97% of particles larger than 0.3 microns) and an activated carbon filter that removes all chemicals, VOCs and odors. An external duct is not required and the air can be returned to the work environment and deemed safe for the end user to breathe.

The ductless enclosure apparatus can be provided with adjustable intensity background white lighting with On/Off power and illumination intensity via Radio Frequency (RF) or infrared (IR), battery powered remote control.

A manual turntable can be provided as standard accessory for the ductless enclosure apparatus. A powered turntable with either a speed control switch or a footswitch can be provided as an optional accessory.

Miscellaneous hooks can be installed as part of the ductless enclosure apparatus to allow for the hanging of the work pieces and equipment on the inside or outside of the work chamber.

According to the model of the ductless enclosure apparatus, either one or all of 110 VAC, 220 VAC, 12 VDC or USB ports can be provided internal to the enclosure to provide accessory power. This eliminates the need to strand many different power cords across the room.

In addition, different accessories and tools for each function and application can be made available for the ductless enclosure apparatus.

Different products for end user safety can be made a part of or optional to the ductless enclosure apparatus.

The ductless enclosure apparatus can have a pre-filter fan flow rate of 450 to 500 CFM.

In addition, a separate attachable heater unit can be provided with a heat intensity control and a timer for automatic shut off for safety.

In another embodiment, the foldable ductless enclosure apparatus includes a attachable heater, mounted using a bracket along the length of the enclosure thereby removing any weight off the top or load bearing on the side walls.

The ductless enclosure apparatus can be provided with a full-frontal door that attaches magnetically or mechanically to seal the front access entrance to the work chamber and allow it to be lockable. The apparatus can be provided with a rubber or the like seal to seal the door onto the front opening of the work chamber. It will also have soft rubber like seals as entry points for the equipment to be used inside the work chamber. The apparatus can further include a set of rubbers like gloves for the operator to manipulate the product inside the work chamber. Contaminants within the work chamber are minimized or eliminated. It could also be lockable to discourage product theft while being worked on (such as diamonds or other valuables).

An air flow sensor and corresponding visual or audible alarms can be provided as required for the ductless enclosure apparatus, ti indicate to the user when it is time to replace one or more of the filters.

A switch, such as a rocker or toggle switch, that reverses the motor polarity and thereby the rotational direction of the fan blades is provided for the ductless enclosure apparatus. This allows the fan to vacuum air (negative pressure) from the work chamber as well as blow air into the work chamber creating a positive pressure environment that expels and prevents external contaminants from entering the work chamber, thereby creating a safe and super clean work environment. The rotational switch that adjusts the rotation speed of the motor from zero and up to full speed, thereby allowing the adjustment of the air flow that is either pulled or pushed by the fan from zero to the maximum flow capacity rating of the fan; in this case up to 480 CFM.

A separate tray with a liquid drain can be provided for the ductless enclosure apparatus.

Particular care has been taken to select a high efficiency, low noise fan thereby reducing the sound level within the chamber of the ductless enclosure apparatus to minimum levels. This noise level is controllable with the provided flow control switch.

This ductless enclosure apparatus can be provided as a multi-purpose enclosure that can encompass the following applications: paint spray booth; air brush booth; fume hood; clean room; heating chamber; dryer; long term conditioning and aging; de-hydrator; hydrator; cooler; washout for photography; sand/bead blasting; clay and pottery; black light chamber; photography backdrop; Sound recording; incubator; seedling and plant growing; color sorting/matching; color proof table; projection booth for use as a template; screen printer; cutting; dusting and steaming.

Some of the advantages of the ductless enclosure apparatus include replacing at least twelve different and separate function specialty enclosures that are now commercially available on the market with just one enclosure. In addition, the ductless enclosure apparatus has many additional features and benefits such as: foldable and requires small storage space; ductless; time-saver, erects and collapses in seconds; lightweight and sturdy; easy to transport; much lower cost in comparison to buying all the products that it replaces; saves work environment bench or table space; comes in many sizes to meet all market needs; all surfaces can be constructed using FDA compatible materials that are safe for food use; meets OSHA requirements for clean air emissions; constructed and shipped either sanitary clean or sterile vacuum packed; tight fit construction minimizing the introduction of contaminants from the environment; eliminates all contaminants, toxic chemicals, hazardous gases, fumes and odors; an adjustable intensity white light; multiple choice of filter packages to fit the specific application; a manual turntable; a powered turntable with a speed control switch or a footswitch; hooks to allow for hanging parts or equipment on the inside or outside of the work chamber.

Different accessories and tools for each of the different applications can be provided to the ductless enclosure apparatus. For example, multiple accessories for end user safety; highly efficient high air flow vacuum and pressure systems; an attachable heater unit with intensity control and a timer for automatic shut off; clear see-through frontal door with access gloves and equipment ports to protect the product and the end user; an air flow sensor and corresponding visual or audible alarms; a one click air flow reversal switch to switch from Paint Booth mode to Clean Room mode; a liquid tray with an external drain; and an overall low noise level.

DETAILED DESCRIPTION OF EMBODIMENTS

The disclosure describes and embodies an inexpensive, affordable, light weight, ductless, foldable and portable enclosure made of High Density PolyEthylene (HDPE) or similar thermoplastic. Its main function is the removal of excess airborne spray paint, chemicals, propellants, fumes and odors but it can also be used for other multiple functions and applications. The disclosure describes an all-encompassing system that combines many functions that are not currently available in any commercially available product.

Figure 4:
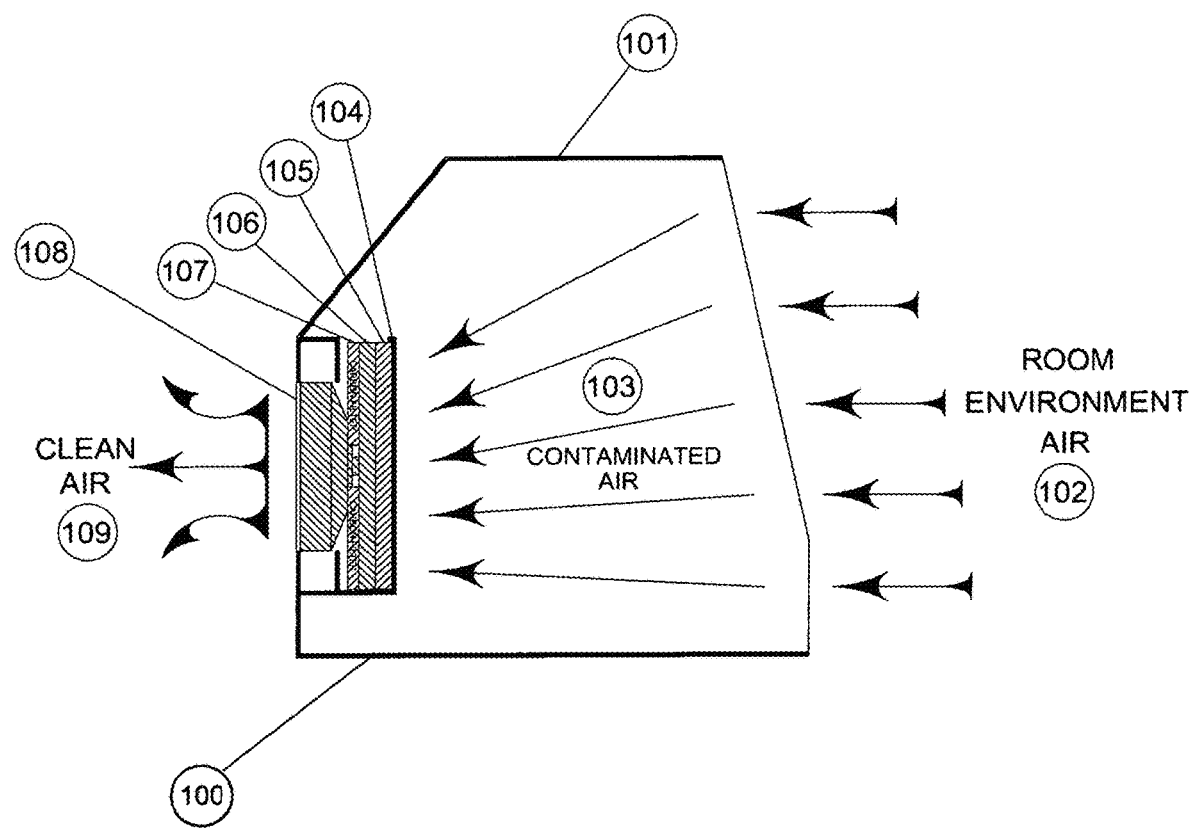
FIG. 4 Spray Booth Mode: illustrates an embodiment of a cross sectional side view of a ductless enclosure apparatus, which shows the work chamber, filter chamber, filters, fan and air flow direction in the vacuum mode (FIG. 5 shows the reversal of the air flow).

In an embodiment, the disclosure provides an air brush and paint spray removal apparatus system, hereinafter referred to as Model 1—Spray Booth (vacuum). Referring now to FIG. 4, there is illustrated an embodiment of a cross-sectional side view of a ductless enclosure apparatus 100. The ductless enclosure apparatus 100 includes: a box shaped housing unit 101 (made up of one or more enclosure panels—not shown), which is predominantly enclosed but also includes a front access opening 102; a work chamber 103 that allows an operator to work within the work chamber 103, and for ingress of room environment air into the work chamber 103 for combination with contaminated air generated in the work chamber 103 to form an effluent stream; a filtration chamber, indicated generally to contain different purpose filters, including a set of 4 stage filters 104, 105, 106 and 107, disposed between the work chamber 103 and an air circulation motorized impeller fan 108, for receiving air from the work chamber 103 and gradually purging unwanted substances from that air out the exhaust opening 109. The filters 104, 105, 106 and 107 can differ in thickness, composition and quantity based on the type of materials being sprayed or air brush painted inside the work chamber 103. The filters 104, 105, 106 and 107 can also differ based on the Model and application (described in a later section to follow).

Definition: Minimum Efficiency Reporting Value (MERV) stands for and is a rating standard that publishes the overall effectiveness of air filters. Higher value MERV rating equates to finer filtration, meaning fewer dust particles and other airborne contaminants can pass through the filter.

Filter Ratings:

Stage 1, Pre-filter: Removes 80%-90% of all large particles greater than 10.0 microns.

Stage 2, MERV 8 filter: Removes 70%-80% of particles 3.0-10.0 microns.

Stage 3, MERV 13: Removes less than 75% of particles 0.3-1.0 microns.

Stage 4, Activated Carbon filter: Removes all odors and Volatile Organic Compounds (VOCs) and chemicals such as Toluene, Xylene and the like, that are commonly used as a propellant in canned air spray applications.

Model 1 minimally uses Stage 2 and Stage 3 filters but could also use stage 1 and stage 4 filters as required and needed by the specific application:

- A stage 1 pre-filter 104 can be a one-time use (one day max) disposable filter that captures most of the paint overspray (mainly used in heavy air brushing of cocoa butter or heavy oil based paints) that can clog up conventional more expensive MERV filters.
- A stage 2 filter 105 with a MERV 8 rating or better to remove what was not captured by the pre-filter.
- A stage 3 filter 106 with a MERV 13 rating that further captures the remaining paint spray particles that were not removed by either the stage 1 pre-filter 104 or stage 2 MERV 8 filter 105.
- A stage 4 filter 107, which can be a 5 to 10 lbs. activated carbon filter or similar so as to remove all VOCs, solvent vapors and any odors remaining in the airstream.

Either of the MERV filters can always also be substituted by a HEPA filter (up to 99.97% efficient on particles 0.3 microns and larger) which would be required in high cleanliness requirement applications such as Medical.

In one embodiment, the foldable ductless enclosure includes a flow monitoring system (not shown) to detect filter degradation and contaminant saturation. It can be positioned either in front of or behind the filters and can trigger a sensor, which in turn can trigger an alarm to alert the user that it is time to replace the filters. The alarm may be visual, audible or a combination of both.

The air circulation motorized impeller fan 108, can be positioned within an interior cavity of the housing unit 101, which creates and directs an airstream to flow from the room environment through the frontal access opening 102, the work chamber 103, the filtration chamber, the filters 104, 105, 106 and 107 and out the exhaust opening 109. This prevents toxic or noxious contaminants from passing from the work chamber 103 into the room environment and aids in the removal of at least a large portion of the contamination to render the airstream safe for consumption. It is to be understood that the air circulation motorized impeller fan 108, may be disposed either upstream or downstream of the filters 104, 105, 106, and 107.

The exhaust outlet opening 109, allows the filtered air to be exhausted into the ambient room environment.

Note that all elements of the air circulation motorized impeller fan 108 operate to maintain a negative pressure within the work chamber 103.

The size of the ductless enclosure apparatus 100 can vary from model to model depending on the end user product size and needs. Many different sizes can be offered but they will all remain similar in design except that they may incorporate one or more motorized fans, different filter types and sizes, and additional accessories depending on the model.

In an embodiment, several door options that selectively either close-off the upper section of the frontal access opening 102 or the full opening height of the opening are contemplated. A full opening door can either be a plain cover or include a set of chemical resistant gloves built into the door for access to the work chamber 103 without any air escaping from the chamber.

The basic model of this disclosure is a paint spray enclosure. The following are other models that this disclosure embodies and represents. All of these models can have a set of functional controls that vary from model to model and they may include one or more of the following controls and indicators.

Figure 1:
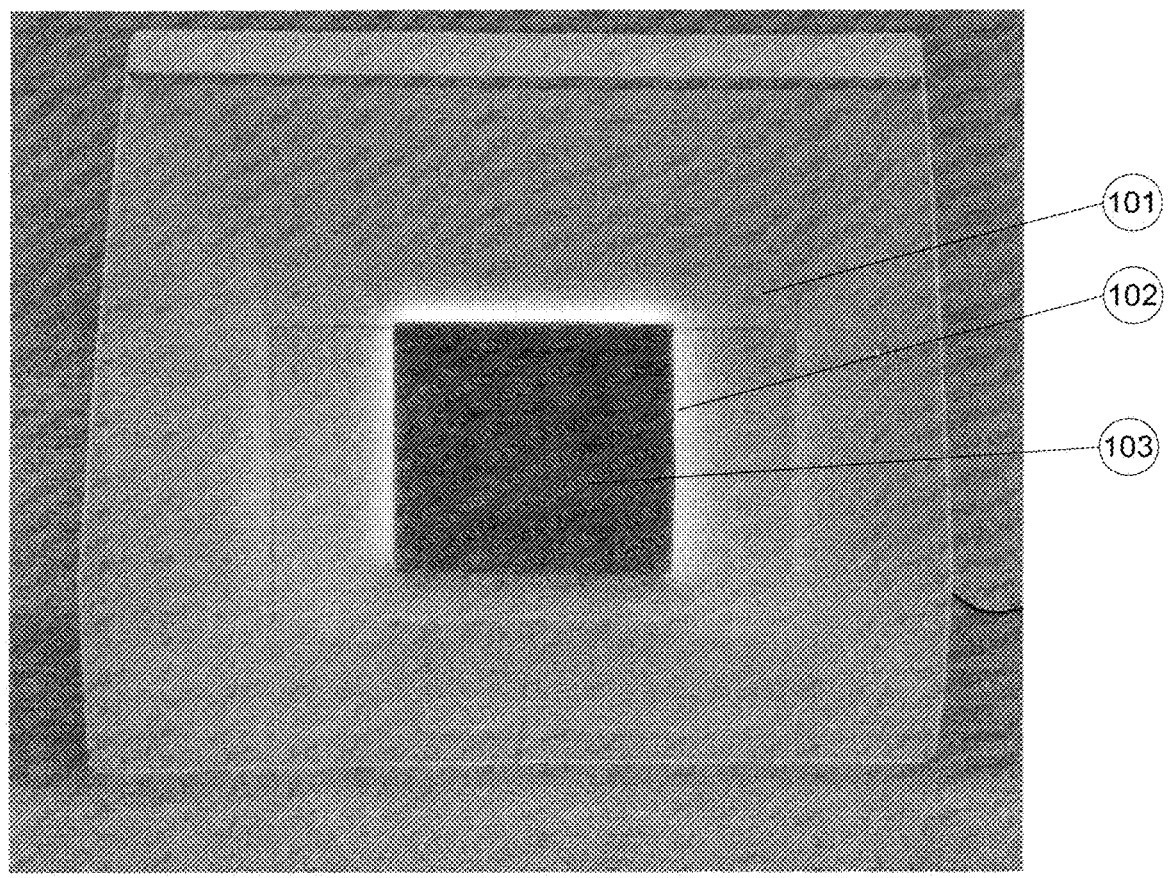
FIG. 1 Frontal View: illustrates an embodiment of a front view of the ductless enclosure apparatus.

Referring now to FIG. 1, there is illustrated an embodiment of a front view of the ductless enclosure apparatus 100, which shows the housing unit 101 surrounding the front access opening 102 to the work chamber 103.

Figure 2:
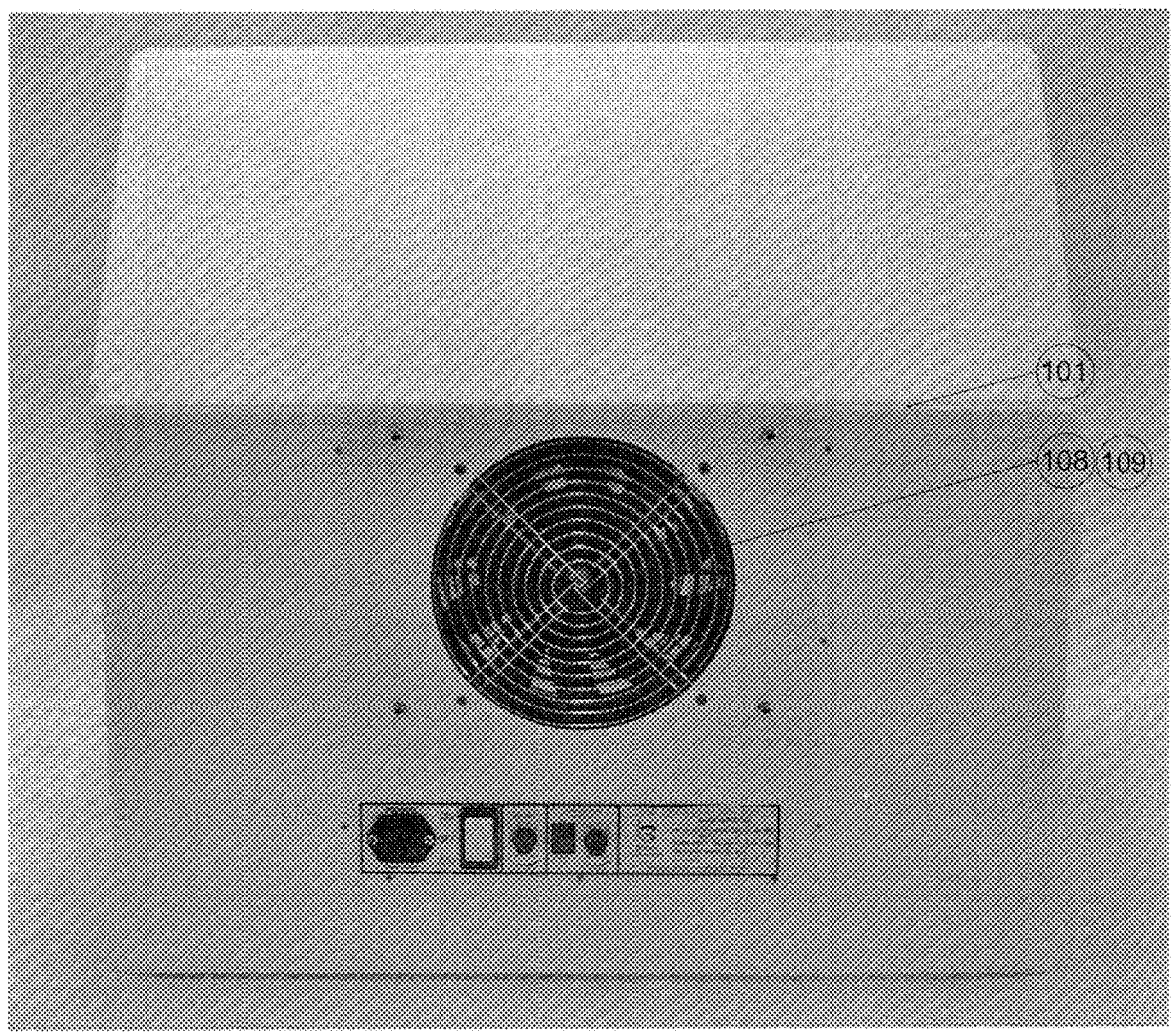
FIG. 2 Rear View: illustrates an embodiment of a rear view of the ductless enclosure apparatus.

Referring now to FIG. 2 there is illustrated an embodiment of a back or rear view of the ductless enclosure apparatus 100, which shows the housing unit 101 surrounding the impeller fan 108 and the exhaust opening 109.

Figure 3:
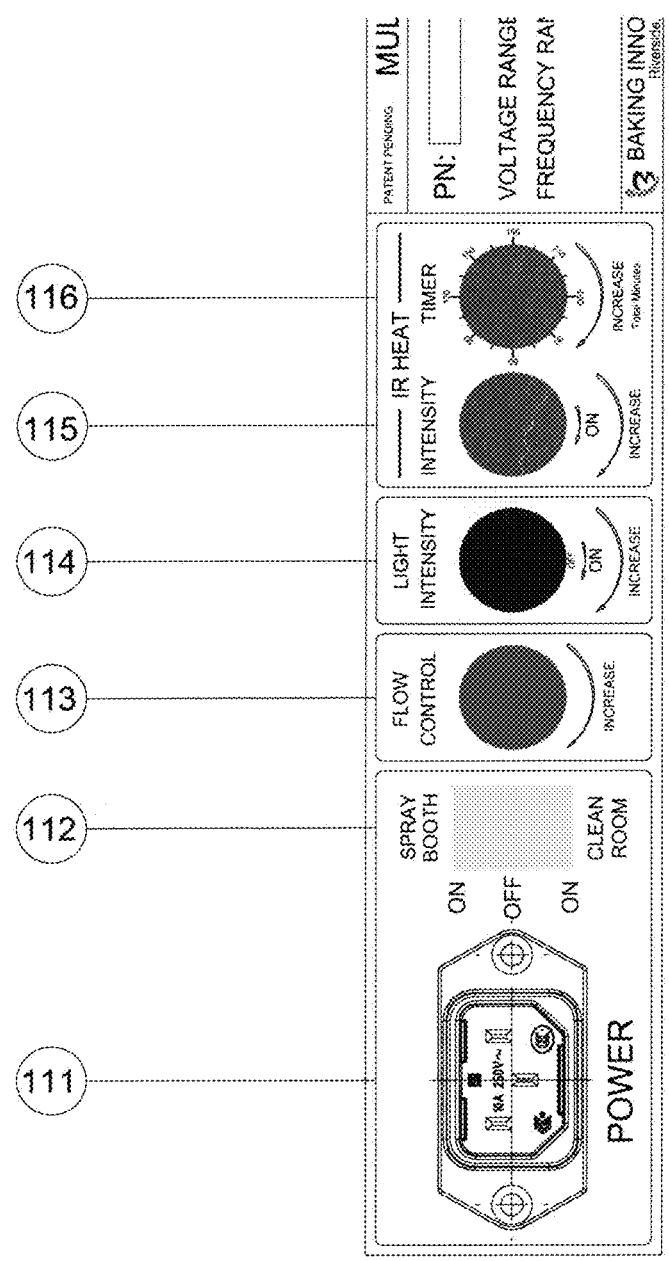
FIG. 3 Control Panel: illustrates an embodiment of a control panel label and physical controls for the ductless enclosure apparatus.

Referring now to FIG. 3, in an embodiment, the ductless enclosure apparatus 101 can include a control panel 110 containing the various controls and indicators. For example, the control panel 110 can include a power entry module 111 for providing electrical power to the fans and lights. In addition, the control panel 110 can include a motor reversal switch 112 for reversing air flow through the ductless enclosure apparatus 101, thereby converting the apparatus from a paint spray booth and fume enclosure hood into a clean room, providing a HEPA clean environment for the assembly of medical devices and other sterile products.

The control panel 110 can also include a variable fan speed control 113 to control the amount of air flow passing through the ductless enclosure apparatus 101; a variable light intensity control 114 in order to vary the illumination level in the apparatus; a variable heat intensity switch 115 in order to vary the amount of heat output in the apparatus; a heat timer 116 in order to shut off the heat being generated inside the apparatus; and a light timer 118 in order to shut off the light inside the apparatus (not shown).

The disclosure further provides an air flow control system and air flow sensor that monitors the amount of air flow that is passing through the filters of the apparatus and can include either a visual light indicator, an audible alarm indicator or both. This is to alert the end user that it is time to replace the filters.

All models can be offered and made available in three separate versions:

The first version can be a standard one with no extra care expanded for cleaning. It can be factory clean and assembled according to Good Manufacturing Practices (GMP). No special care can be done for extra cleaning. Its use can be general industrial.

The second version can be sanitized. All surfaces can be wiped clean with special disinfectants and enclosed within a large plastic bag to protect it from dust and other contaminates. It can be used for clean operations such as food handling (food grade).

The third version can be sanitized and all surfaces can be wiped clean with various disinfectants. Additionally, it can be placed in special packaging and sterilized using either ethylene oxide or gamma radiation to eliminate all bacteria and contaminants. Its use can be more for industries that require this high level of bacteria and contamination control such as in the medical industry (medical grade).

The following is a description of the various models that can be made part of this disclosure and available for commercial and non-commercial use. Other models and variations thereof that use a similar enclosure will also be embodied in this patent application: The following models are listed in the accompanying Table 1:

TABLE 1

| FIG NO | MODEL # | MODEL DESCRIPTION | FUNCTIONS | ACCESSORY | FILTERS Stage 1 PRE | Stage 2 MERV 8 | Stage 3 MERV 13 | Stage 4 CARBON | HEPA Option | HYDROPHILIC |
|---|---|---|---|---|---|---|---|---|---|---|
| 4 and 5 | 1 | Spray Booth (Vacuum) | Spray Painting using aerosol cans | None standard model | | X | X | X | | |
| | | | Air Brushing with no chemicals | | X | X | X | | | |
| | | | Air Brushing using chemicals | | X | X | X | X | | |
| | | | Soldering or Chemical lab work | | | | X | X | | |
| | | Clean Room (Positive Pressure) | Clean Assembly work | | | X | X | | X | |
| | | | Light drying | | | X | X | | | |
| 6 | 2 | Dehydration Heating | Dehydrating | Heater | | X | X | | | |
| | | | Heating | | | X | X | | | |
| | | | Drying | | | X | X | | | |
| 7 | 3 | Hydration Cooling | Humidifying | Wet Box | X | | | | | X |
| | | | Cooling | Hydrophilic Filter | X | X | | | | X |
| 8 | 4 | Photography Backdrop | Taking pictures | Backdrops lighting | | | | | | |
| 9 | 5 | Projection Inspection | Using a template for dimensional Inspection | Back Panel Projector scale | | | | | | |

TABLE 1-continued

| FIG NO | MODEL # | MODEL DESCRIPTION | FUNCTIONS | ACCESSORY | Stage 1 PRE | Stage 2 MERV 8 | Stage 3 MERV 13 | Stage 4 CARBON | HEPA Option | HYDROPHILIC |
|---|---|---|---|---|---|---|---|---|---|---|
| 10 | 6 | Hydrocarbon Contamination | Using UV in a black room to detect hydrocarbon contamination. | Black walls UV light | | | | | | |
| 11 | 7 | Color Matching | Matching colors between samples and comparing to Pantone standard | 5 light sources | | | | | | |
| 12 | 8 | Sandblasting | Engraving and sandblasting | Sandblasting equipment | X | X | X | | | |
| 12 | 9 | Photo Processing | Cutting, Steaming, Developing photos | Tray Drain | | X | X | X | | |
| 12 | 10 | Jewelry | Sculpting/processing jewelry and gems in a secure enclosure | Front door | | | | | | |
| 12 | 11 | Incubator | Egg Incubator, Low Heat Dryer, Plant Growing | Heater | | | | | | |
| 12 | 12 | Medical | Clean room assembly | HEPA filter Front door | | X | X | | X | |
| 13 | 12 | Sound Recording | Used as a sound recording booth | Sound absorbing Foam | | | | | | |

Figure 5:
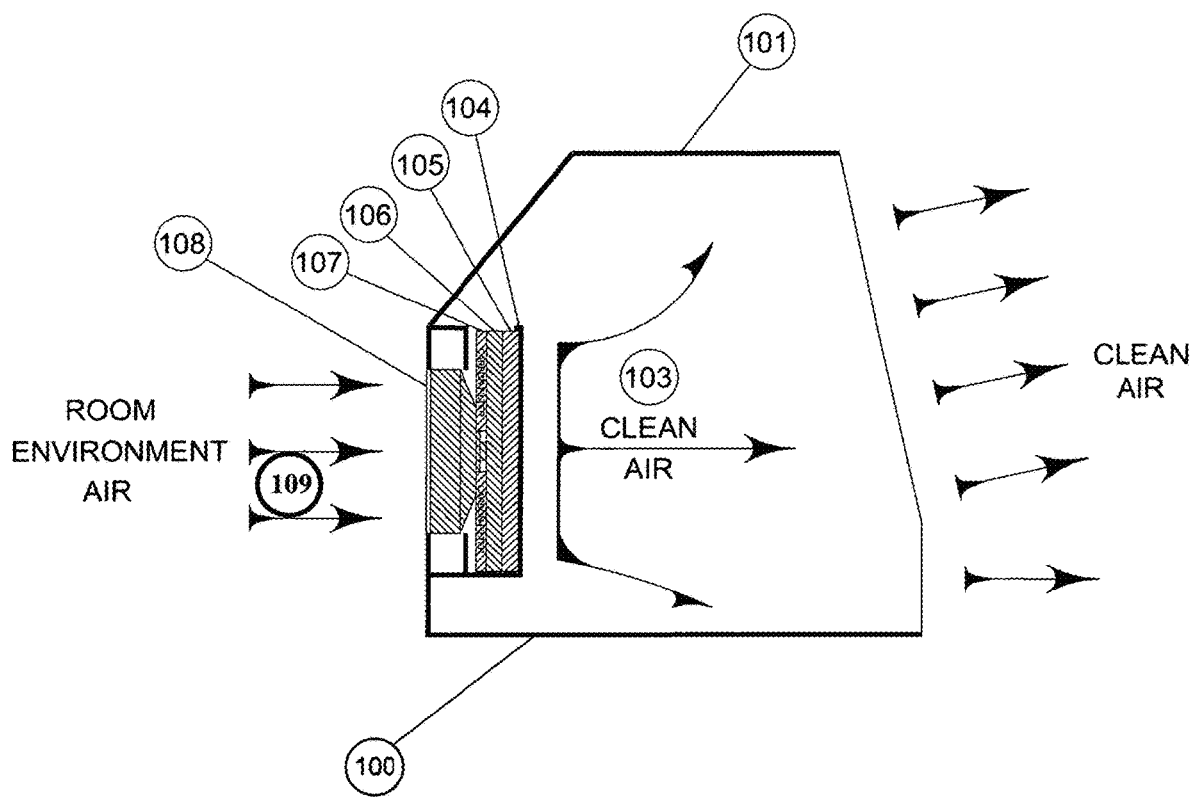
FIG. 5 Clean Room Mode: illustrates an embodiment of the cross sectional view of the ductless enclosure apparatus, in which the air flow direction is reversed by running the fan in reverse voltage polarity to create a positive pressure clean room environment inside the enclosure chamber.

Model 1—Spray Booth (Vacuum)—FIG. 4 and Clean Room (Pressure)—FIG. 5

This is the base model ductless enclosure apparatus described above in FIGS. 4 and 5. It operates in a vacuum mode, drawing air from the room environment, through the work chamber, filter chamber and filters, the air circulating fan and out the exhaust at the back of the enclosure. The apparatus can be used for objects that need to be spray or air brush painted. Since many paint sprays are aerosols and have toxic VOCs in them, they can be harmful to the work environment and the end user. The apparatus features a three-tier filtration system along with a high flow fan in order to solve this pollutant issue.

Amongst many more applications not yet fully realized or discovered, this model serves six different applications:
Spray Booth Mode:
Spray paint using aerosol cans
Air brushing with no chemicals.
Air brushing using chemicals.
Soldering and chemical lab work.
Clean Room Mode:
Clean assembly work.
Light drying.

The apparatus can include a filtration system that integrates all filter stages plus a HEPA and activated carbon filters described above in order to create a safer working environment for all users:
  The first filter can be a pre-filter in order to remove most of the paint solids especially when using cocoa butter or heavy paints including oil based paints.
  The second filter can be a MERV 8 filter.
  The third filter can be a MERV 13 filter.
  The fourth filter can be an activated carbon filter, which uses a bed of activated carbon in order to remove contaminants, impurities and odors by chemical absorption. The typical particle sizes removed by carbon filters range from 0.5 to 50 microns. The Carbon filter can best be used with aerosols containing toxic VOCs or exhibiting strong odors.
  The fifth filter can be a HEPA filter which removes 99.97% of all particles that are 0.3 microns in size or larger.

The apparatus also provides disposable wall covers, which can be used with paint sprays in order to prevent toxic chemicals from forming in the air inside the work chamber as well as the user's environment.

Figure 6:
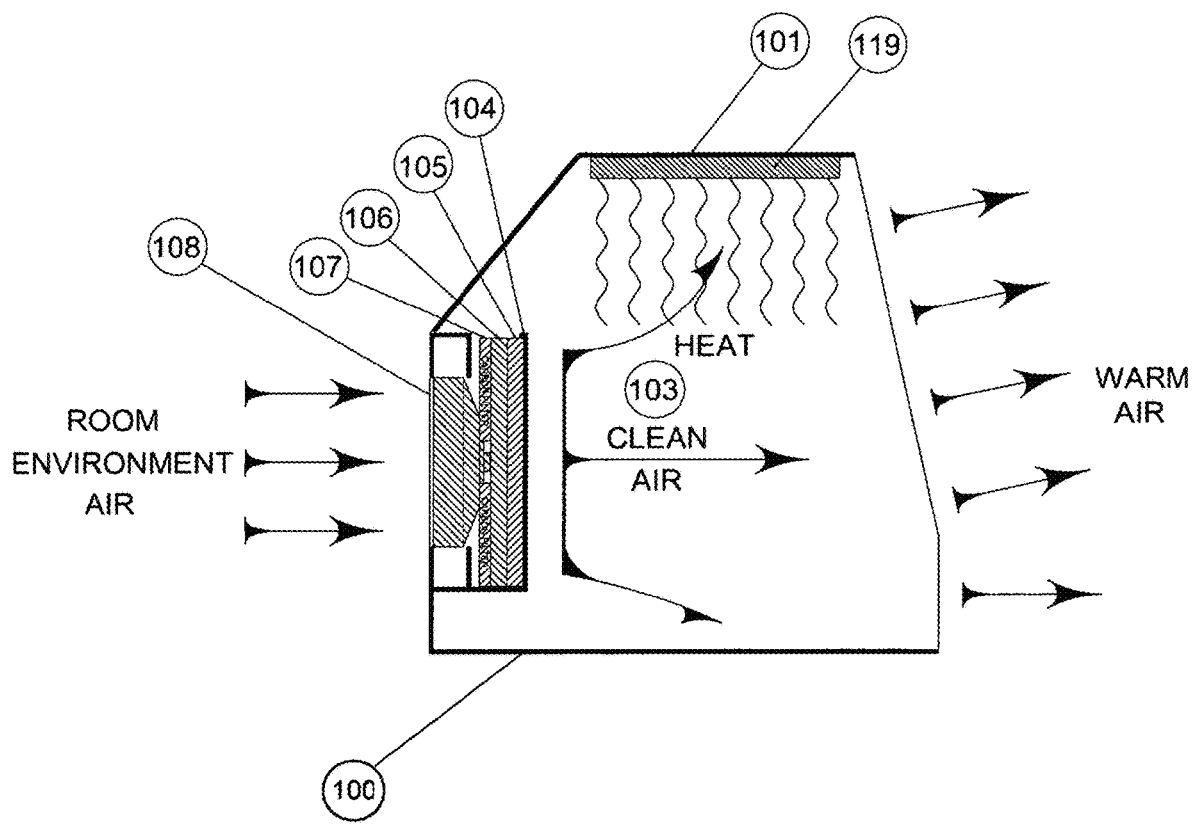
FIG. 6 Heating/Dehydration: illustrates an embodiment of the cross sectional view of the ductless enclosure apparatus, with the addition of a warming ceramic heater or infra-red heating lamp.

Model 2—Dehydration Heating (Positive Pressure)—FIG. 6:

As shown in FIG. 6, the air circulation motorized impeller fan 108 can be a reversible fan, which can be used to push air into the work chamber 103 and used for drying purposes. More often than not, time is wasted waiting for a project work piece to dry. A low positive pressure air flow can allow air to reduce the drying time on products that have been sprayed and are wet or tacky to the touch. This can be used for a range of applications to expedite the release of solvents within the paint materials, glue or even nail polish. It is also used for drying, dehydrating, dry
Pottery Sculpting Many materials present a problem of drying time, especially when used in an open environment that could be cold or humid. To solve this problem, a variable air flow can be pre-set on the fan by the end user. As shown in FIG. 6, an infra-red heater 119 can be placed in the work chamber 103 so that heat can be generated and drying can be accomplished in minutes rather than hours.

In addition, this configuration can be used for long term dehydration of food products or sculpted clay products. This can be accomplished using low air flow with or without heat. Dehydration of the products can occur in a few hours and a timer can be set to end the process without end user interference. If necessary, a special hydrophobic filter (removes moisture) could replace the pre-filter to remove most of the humidity from the air stream.

With this feature, products can dry much faster as the moisture and volatile chemicals that cause the work piece to be wet, can be removed efficiently. This is an excellent tool for artists and pottery makers who need to keep their work dry so they can continue to work with it without the risk of it collapsing due to extra wetness.

Another unique and advantageous use of low heat in the ductless enclosure apparatus 100 is the option of using the enclosure for egg incubating, bacteria growth and plant growing. As shown in FIG. 6, the heat supplied by the infra-red heater 119 can provide a gentle heat that can be controlled by an intensity control as shown on the Control Panel 110. This is a perfect incubator for many applications.

Model 3—Hydration Cooling. (Positive Pressure)—FIG. 7:

Hydration:

In this model, the fan direction is reversed thereby drawing air from the room environment into the chamber. The air flows through the wet box first, collects water particles from the wicking filter and carries it inside the work chamber. This air undergoes the process of evaporative cooling which become several degrees colder and more humid. Temperature drops of 12 to 20 degrees Fahrenheit and elevation of relative humidity by up to 50% relative humidity are common. This type of evaporative cooling has never been used in such an enclosure before. The benefit of this process is to keep the end use work piece moist and cool thereby preventing early drying and or softening and melting of the product (fondant, paint or clay).

Figure 7:
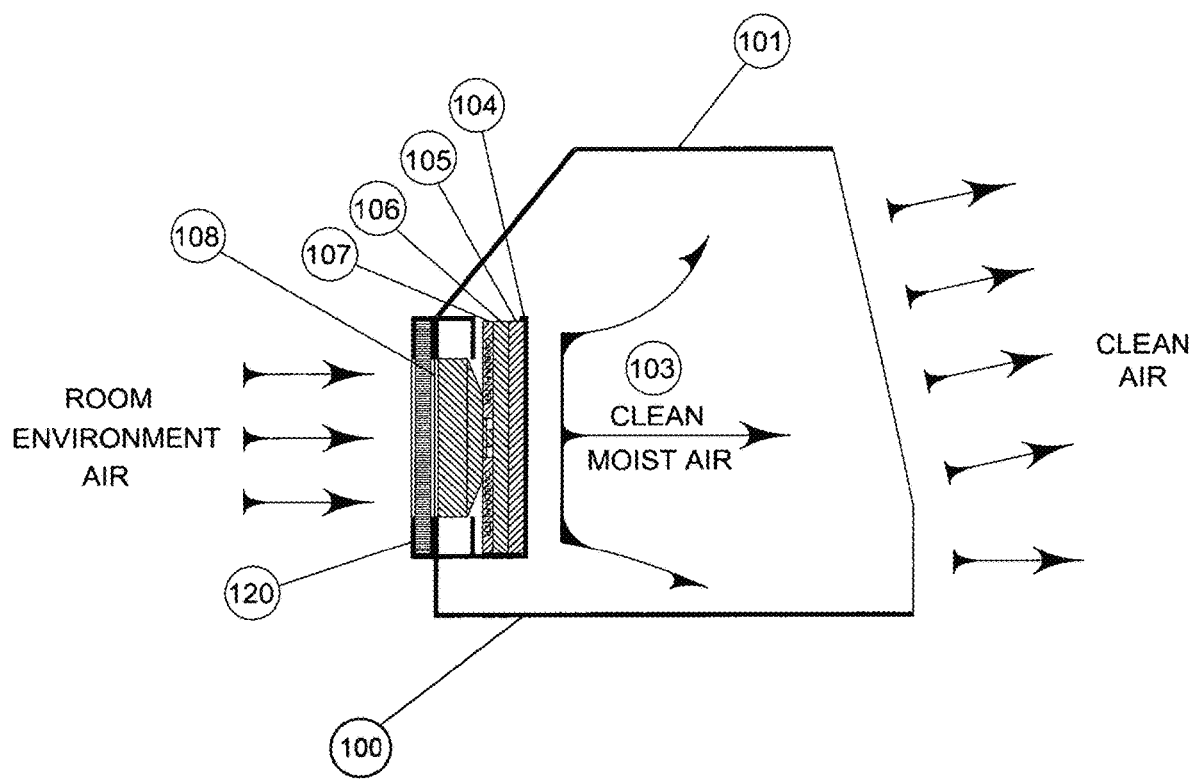
FIG. 7 Cooling/Hydration: illustrates an embodiment of the cross-sectional view of the ductless enclosure apparatus, with the addition of the "Wet Box" humidification attachment onto the back, against the fan. This attachment consists of a plastic or like material box with a circular opening at each side wall with a Hydrophilic (water retaining) wicking filter contained within. When water is added to the bottom of the box, it wicks up the filter. When the unit is placed in "Clean Room" mode, air is drawn from the outside environment through the filter causing the water to evaporate causing cooling of the intake air. Air provided to the chamber is thereby saturated with moisture. The moisture inside of the enclosure work chamber goes up and the temperature goes down.

This model can be also be used as a work piece hydrator to add moisture to products such as fondant material used in the cake baking industry or to keep clay moist during pottery sculpting. As shown in FIG. 7, this can be accomplished using a variable air flow that can be pre-set by the end user. In order to add water, a wet box 120 can be provided, to be mounted on the back of the work chamber 103 at the exhaust opening 109. Inside the wet box 110 can be a hydrophilic filter (not shown). The wet box 120 can have a water holding tank (not shown) that holds a replenishable preset amount of water. The water reservoir replenishes the hydrophilic filter, which wicks water to it gradually adding moisture to the air flow as it is used in the hydration process. The filter can be wetted prior to assembly and the reservoir that is present at the bottom of the box can be filled with water. This tool is excellent for bakers, artists, and pottery makers who need moisture in their projects or paint so that they can have more time to work with their project rather than having it dry up before completion. In addition, this configuration can be used for long term hydration of the work piece in any application that requires a product to be kept moist for any time duration. This is accomplished using low air flow with or without heat, to be done over a preset time period that can be accomplished using a timer that can be set to end the process without end user interference.

Cooling:

Cooling through evaporation is a natural occurrence through the principle of evaporative cooling. Direct evaporative cooling can be used to lower the temperature and increase the humidity of air using latent heat of evaporation, changing liquid water to water vapor. In this process, the energy in the air does not change. Warm dry air is changed to cool moist air. So, as water is evaporated, energy is lost from the air thereby reducing the temperature. Water evaporating through the hydrophilic filter of the wet box 120 causes the output air into the work chamber 103 to be colder than the ambient environment air. This can cool the work piece and provide moisture at the same time. If dry cool air is desired, then the pre-filter can be replaced with a hydrophobic filter that removes all moisture from the air while maintaining the air in a cold state. This is similar to the process used by devices to cool a living environment. These devices are well known as evaporative or swamp coolers. In addition, this configuration can be used for long term hydration of the work piece in some applications that require a product to be kept moist for any time duration. This is accomplished using low air flow with or without heat, to be done over & preset time period. This can be accomplished using a timer that can be set to end the process without end user interference.

Figure 8:
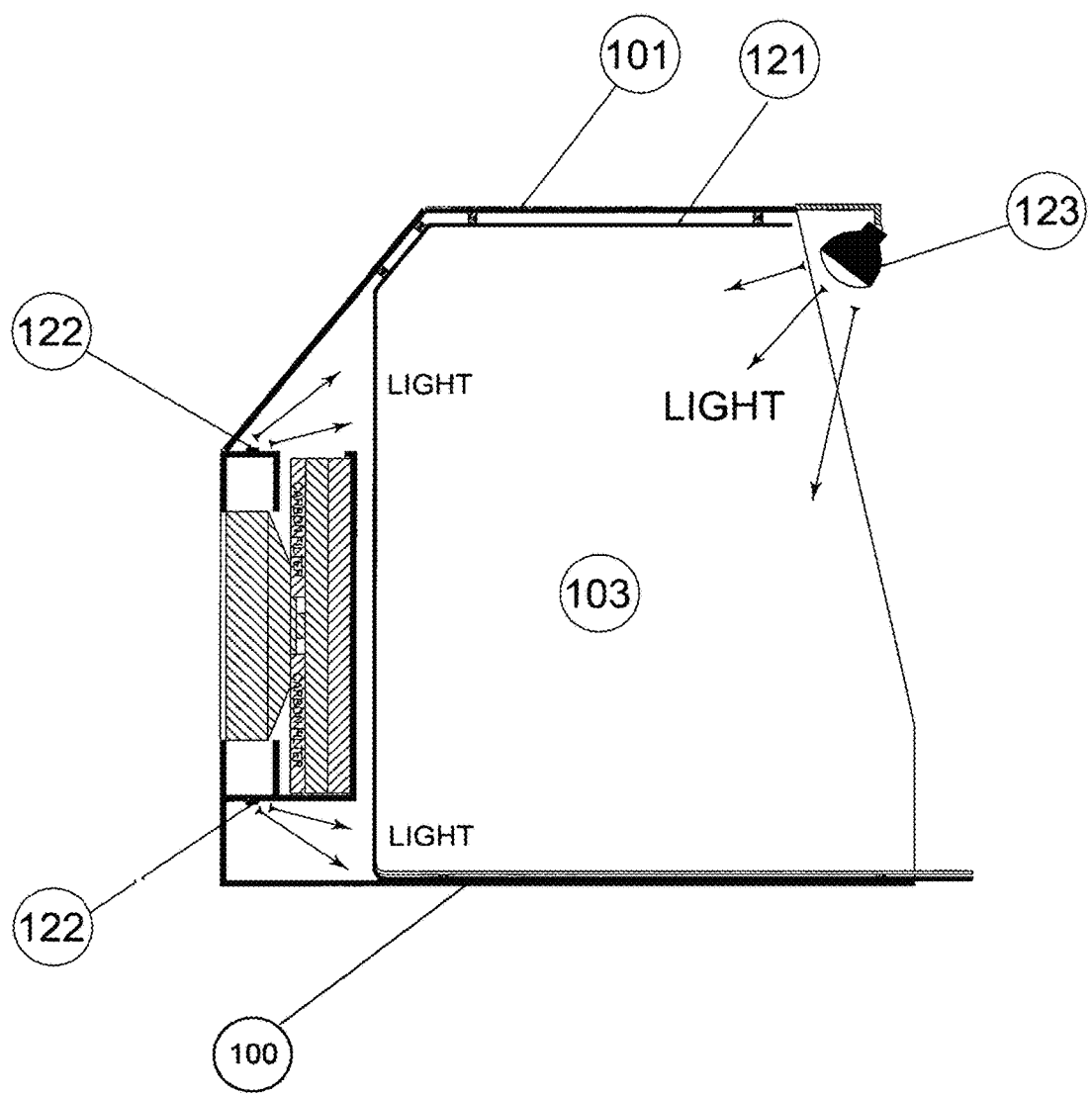
FIG. 8 Photography Backdrop: illustrates an embodiment of the cross-sectional view of the ductless enclosure apparatus, with the addition of a wall covering along the back and bottom of the chamber that act as a picture background of the work piece.

Model 4—Photography Backdrop (No Air)—FIG. 8:

As shown in FIG. 8, an easy conversion of the standard enclosure in Model 1 above is possible with the addition of a flat backdrop roll material 121 that can be attached with fasteners, to the top, back and bottom of the work chamber 103, providing an end user changing background for taking photographs of a work piece.

An LED light strip 122 can be provided in the ductless enclosure to assist in providing special photography front and back lighting effects to the work piece. The LED light strip can be adjusted either remotely via a remote control or by one or more switches located on the control panel 110, in order to turn ON the strip and/or adjust the light intensity and the color of the lighting of the strip.

Finally, the ductless enclosure apparatus can also feature the option of adding clip on lighting 123 or by other fastening methods such as Hook and loop or magnetic means of attachment, to create whatever artificial lighting environment the end user desires for illuminating the work piece.

Figure 9:
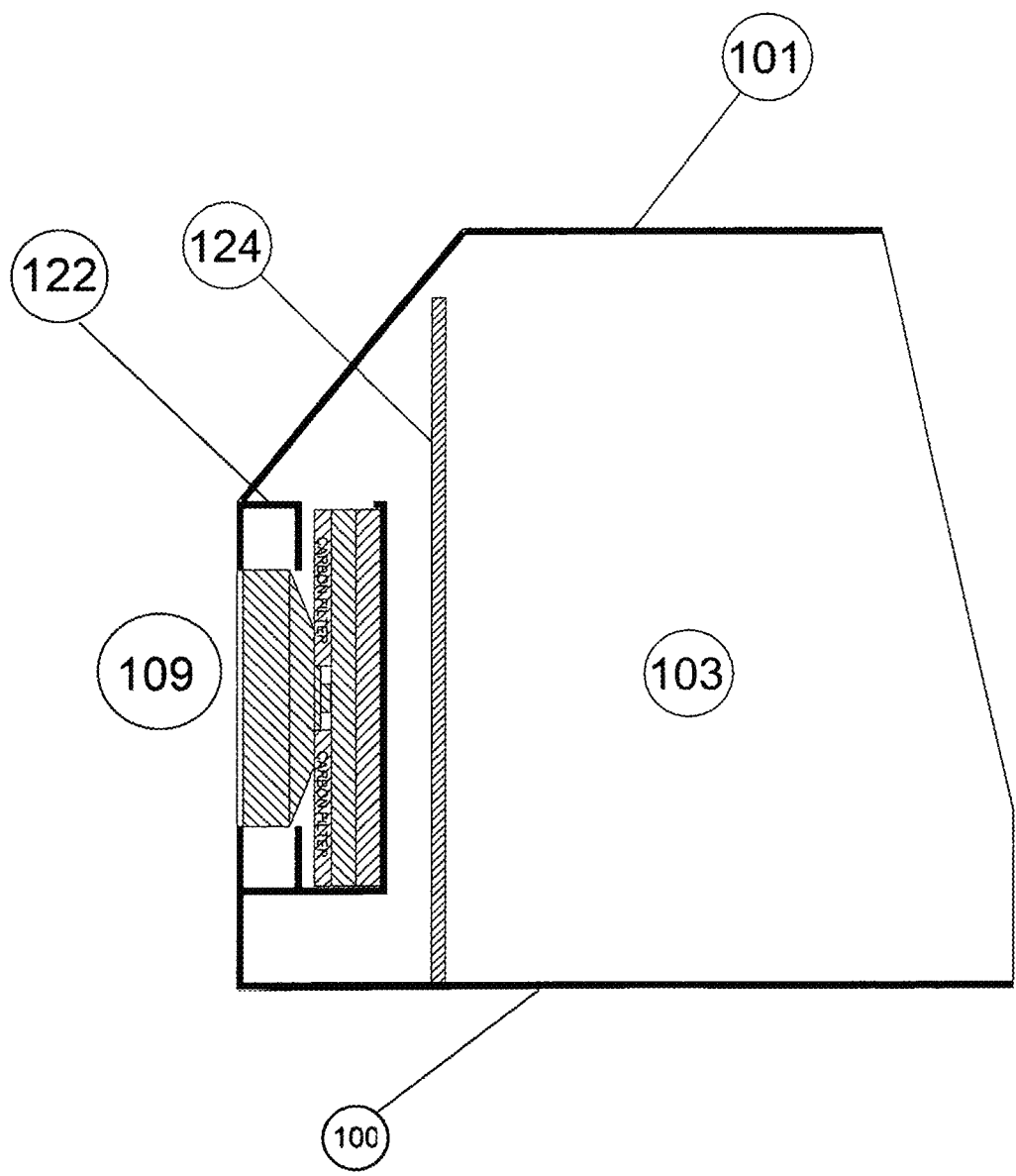
FIG. 9 Inspection/Projection: illustrates an embodiment of the cross-sectional view of the ductless enclosure apparatus, with no air flow and with a back panel to allow for the projection of magnified images on the panel.

Model 5—Projection Inspection (No Air)—FIG. 9:

As shown in FIG. 9, this model utilizes the ductless enclosure apparatus 100 of Model 1, except the fan and filters are not activated. A white back panel 124 can be added and can be used in projecting a magnified image of the work piece as commonly practiced in either photography screening or part dimensional inspection practices.

The work piece can be placed on the bottom of the work chamber 103 and with the use of an appropriate projector, a magnified image of the work piece can be projected onto the back panel 124, allowing for a closer view of the work piece features. Lighting can be optionally turned on by the LED strip 122 provided around the exhaust opening 109.

Figure 10:
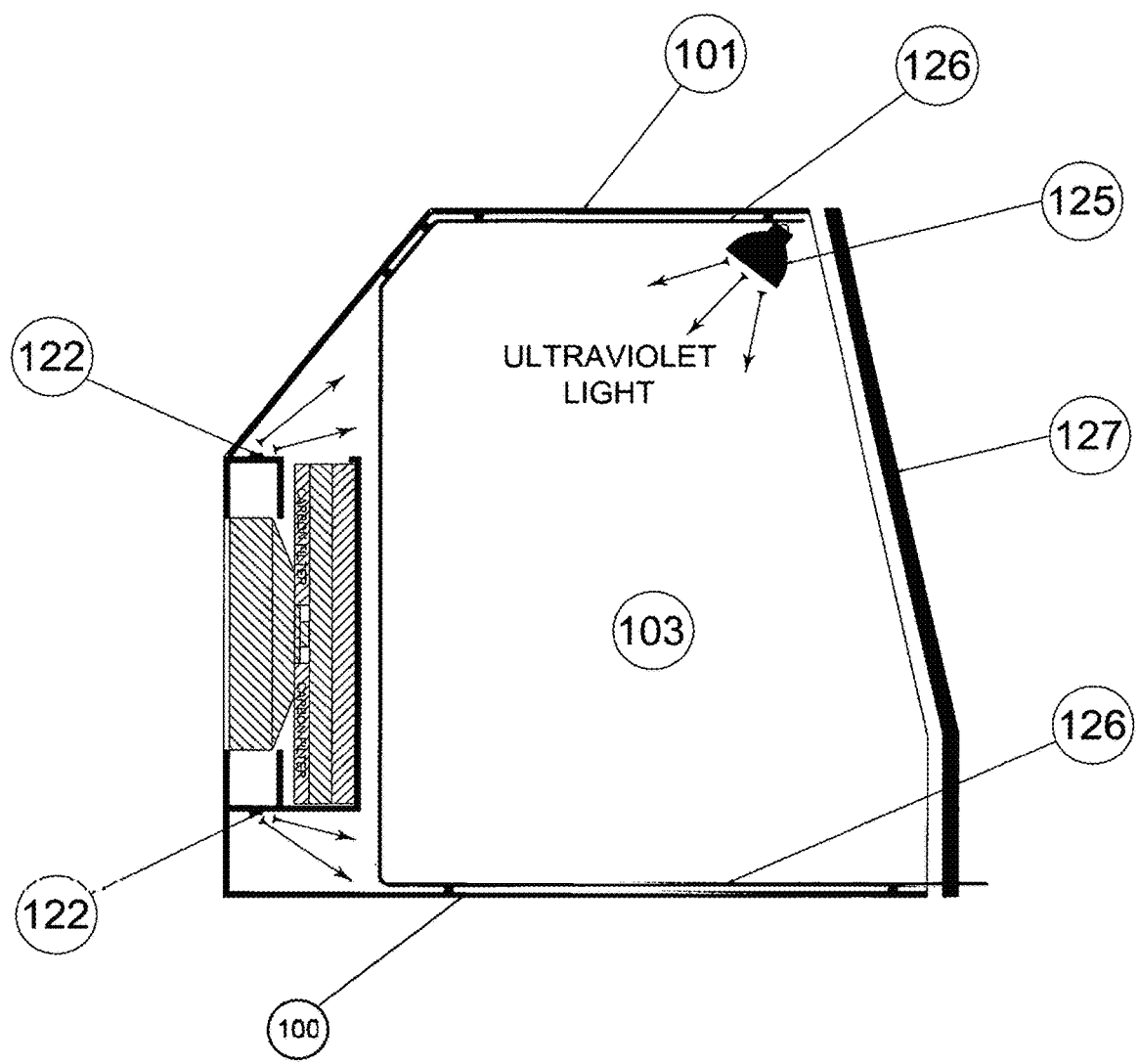
FIG. 10 Hydrocarbon Contamination: illustrates an embodiment of the cross sectional view of the ductless enclosure apparatus, with no air flow and the addition of a series of 5 lamps with different light wavelengths to do color sorting and matching against a Pantone color set (see, Table 1)

Model 6—Hydrocarbon Contamination—FIG. 10:

As shown in FIG. 10, this model serves as what is commonly known as a black light room. This refers to viewing a subject work piece in a dark environment utilizing an ultraviolet light source (also known as a black light) 125. This type of system is commonly used in industry to detect hydrocarbon contamination on components. The ultraviolet light lights up the surface of the work piece and causes all hydrocarbon contamination spots to become fluorescent, thereby alerting the end user as to the presence of contamination.

The ductless enclosure apparatus uses the same set up as in Model 1 but air circulation, lighting or filters are not needed. However, it may be beneficial to have the enclosure in a positive pressure clean room mode, at the discretion of the end user.

In order to make the work chamber 103 dark, a black liner material 126 can be attached to all of the interior surfaces of the chamber, using hook and loop fasteners.

In case of excessive external lighting, an opaque cover 127 can be used to close off the opening of the work chamber 103 as shown in FIG. 10. The opaque cover 127 can have a small clear viewing port hole (not shown) in order to allow viewing the work piece from the outside environment without having to open the cover.

Figure 11:
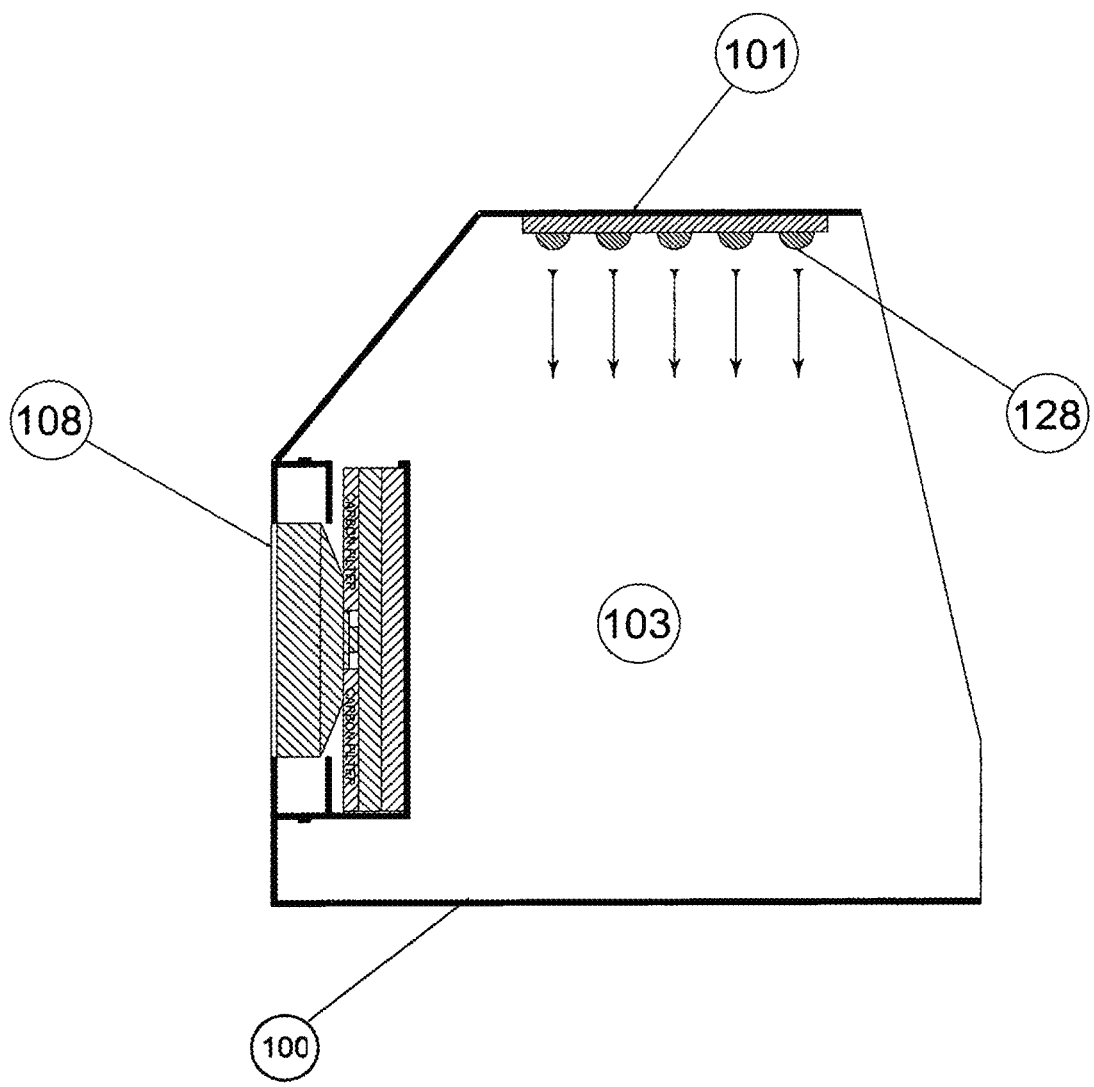
FIG. 11 Color Matching: illustrates an embodiment of the cross sectional view of the ductless enclosure apparatus, with no air flow and a black wall covering for all walls, top and bottom to create a dark room environment. It also comprises an Ultraviolet light which cause contamination to fluoresce.

Model 7—Color Matching (No Air)—FIG. 11:

Colors can appear differently under different lighting sources. As shown in FIG. 11, to avoid and reduce the assessment error when performing color contrast, a color sorting enclosure, i.e. a color light box 128, can be used in the work chamber 103 to simulate different light sources. This can assist in obtaining an objective assessment of the color and color difference.

The color sorting enclosure or color light box can be applied to the industries that need to perform color difference testing as follows: as the premiere designer and manufacturer of color viewing and lighting products for the graphic arts, photographic, textile, dyeing, packaging, Printing, leather, inks, knitwear, plastic, automotive and ceramics industries.

This model is similar to Model 1 above but without air flow or filters. The work chamber 103 can be equipped with a color light box 128 including a five light fixture 129 that attaches to the top of the work chamber, and floods the work chamber with the pre-selected light (see, Table 2).

TABLE 2

| Light Source | Color viewing booths Application | Color temterature(K) | Power(W) |
|---|---|---|---|
| D65 | International standard Artificial Daylight | 6500 | 18 |
| TL84 | Applied to stores in Europe, Japan and China | 4000 | 18 |
| CWF | (Cool White Fluorescent) American Standard | 4150 | 18 |
| F/A | "Sun-setting Light Yellow" incandescent light source (imitation of sunset) | 2700 | 40 |
| UV | Viewing under ultraviolet light to detect and evaluate optical brighteners or fluorescent pigments. | Wavelength: 365 nm | 20 |
| U30 | Warm White Fluorescent, American Standard | 3000 | 18 |

The light fixture 129 can be constructed with 5 different wavelength light bulbs simulating respectively artificial daylight, stores in Europe, Japan and China, cool white fluorescent, sun setting light yellow incandescent, ultra violet light and warm fluorescent light. In addition, a control switch can be part of the light fixture that allows the end user to select the desired lighting condition. A Pantone selection chart for easy comparison can also be made available.

Figure 12:
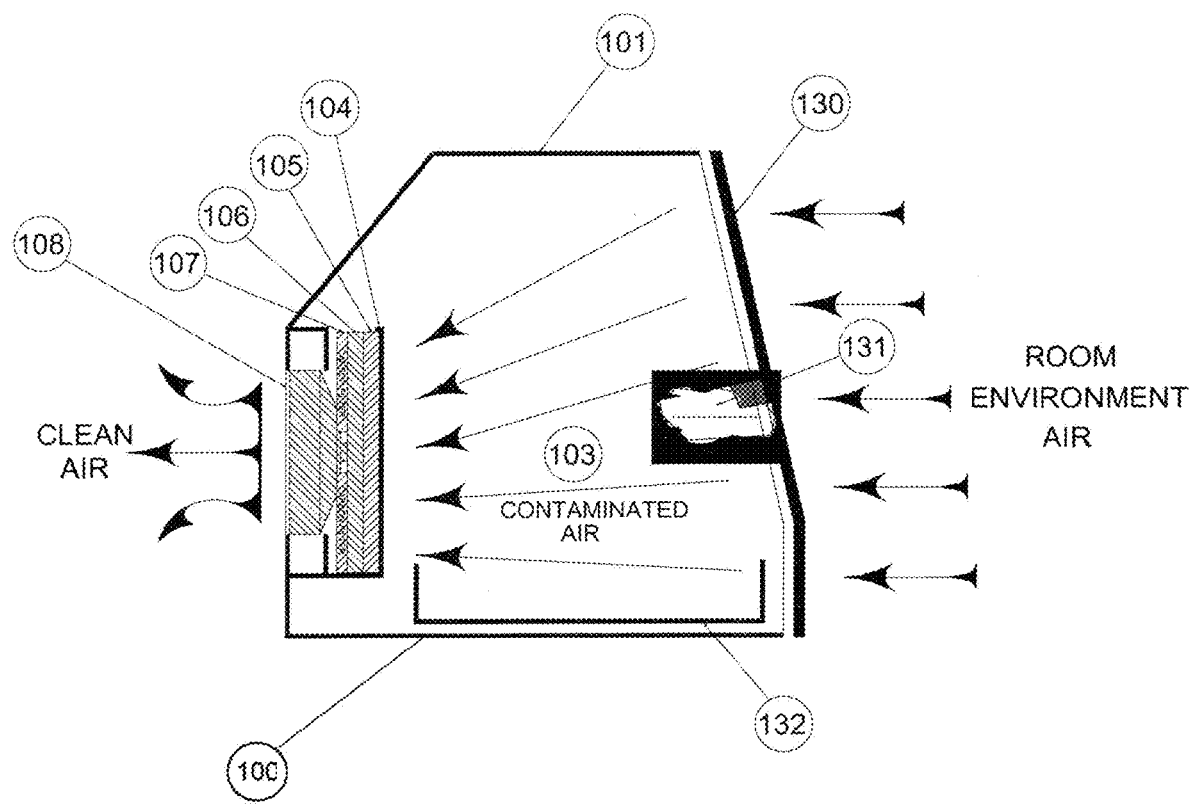
FIG. 12 Jewelry/Medical, Photo Processing/Sandblasting: illustrates an embodiment of the cross-sectional view of the ductless enclosure apparatus with a front cover and built in gloves to be used for jewelry, medical, photography and sand blasting processing applications. It also illustrates an embodiment of the cross-sectional view of the ductless enclosure apparatus, with the addition of a sandblasting tray, a sandblast gun and a front cover with built in gloves to protect the end user.

Model 8—Sandblasting—FIG. 12:

As shown in FIG. 12, this model is similar to Model 1 above but without air flow or filters. However, it could be used at a low air flow setting for vacuuming excessive dust that is generated in the work chamber. The ductless enclosure apparatus 100 can be equipped with a full chamber inlet opening cover 130 in order to seal off the work chamber 103. The opening cover 130 can have a set of built in rubber gloves 131 for the end user to manipulate a sandblast gun (not shown) and work piece inside the work chamber. A sand collection tray 132 can also be used to capture excess falling sand.

Model 9—Photo Processing and More—FIG. 12:

By making use of high quality plastics, the ductless enclosure apparatus 100 can be used with an embedded ruler cutting board accessory for all different kinds of projects. With the featured lighting, it is easy to see what you are doing as you delicately adjust the size of the work piece; The ductless enclosure apparatus 100 can also be useful for steaming a work piece such as would be in the manipulating of fondant shapes using an external accessory steaming gun. Photography print washout basins can also make use of the ductless enclosure apparatus 100 with an optional accessory tray provided with a liquid drain spout.

In addition, the ductless enclosure apparatus 100 can be utilized for screen printing operations where all toxic fumes can be vacuumed out and returned safely to the environment.

Model 10—Jewelry—FIG. 12:

Another feature of this embodiment is the addition of a locking front door that allows the storage of gems and precious metals inside the chamber for worker processing. The only access to the objects stored on the interior of the chamber would be through the built-in gloves. This provides an added measure of security. The worker is not able to remove any of the precious contents without obvious tampering with the lock mechanism.

Model 11—Medical (Clean Room with Positive Pressure)—FIG. 12:

Unlike the clean rooms required by professional laboratories and medical device manufacturers, the ductless enclosure apparatus 100 can provide a conveniently sized laminar flow HEPA filtered clean room for personal use at home or an industrial setting. The featured HEPA filter mentioned above serves the purpose of providing medical grade clean air that would be suitable for medical and other sterile device manufacturing. This model could be provided with a half-height front door or with a full height door and access through the built-in rubber gloves, similar to the ones used by the Sandblasting Model.

Model 12—Sound Recording (No Air)—(No FIG. Shown):

The Sound Isolation Recording features sound dampening foam that assists unwanted sounds from contaminating recordings. This model creates an acoustic boundary around the microphone that improves vocal audio flow—directing voice to the containment area, and at the same time, preventing room reflections from directly entering the recording zone. It helps achieve a more crisp and clean sound, preferred by most music professionals. Unwanted outside audio waves and vibrations, also known as noise and interference, are shielded while voice has a clear path to your microphone.

An easy conversion of the standard enclosure in Model 1 above is possible with the addition of this set of sound absorbing foam panels to all interior surfaces of the work chamber. These are easily fastened with the provided strips or pads of hook and loop materials.

Figure 13:
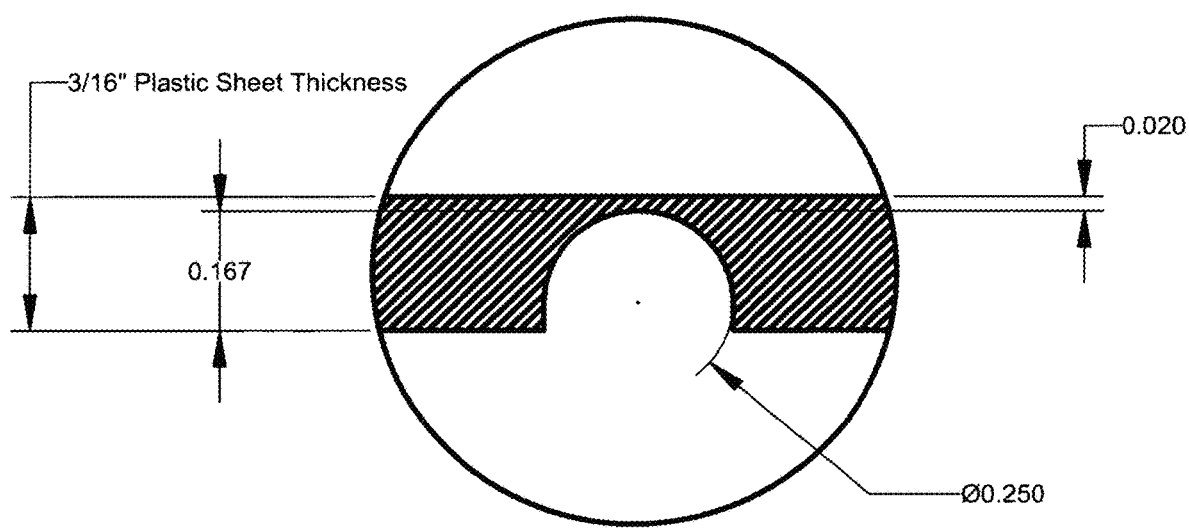
FIG. 13 illustrates an embodiment of a living hinge of the ductless enclosure apparatus.

FIG. 13 illustrates an embodiment of a Living Hinge (Style 1) of the ductless enclosure apparatus 100. A living hinge is a thin flexible hinge made of the same material as the two rigid pieces it connects. It is typically thinned or cut to allow the rigid pieces to bend along the line of the hinge. As shown in FIG. 13, the living hinge can be a circular cut out, which connects the enclosure panels of the housing unit 101 and allows the housing to fold upon itself for storage.

Figure 14:
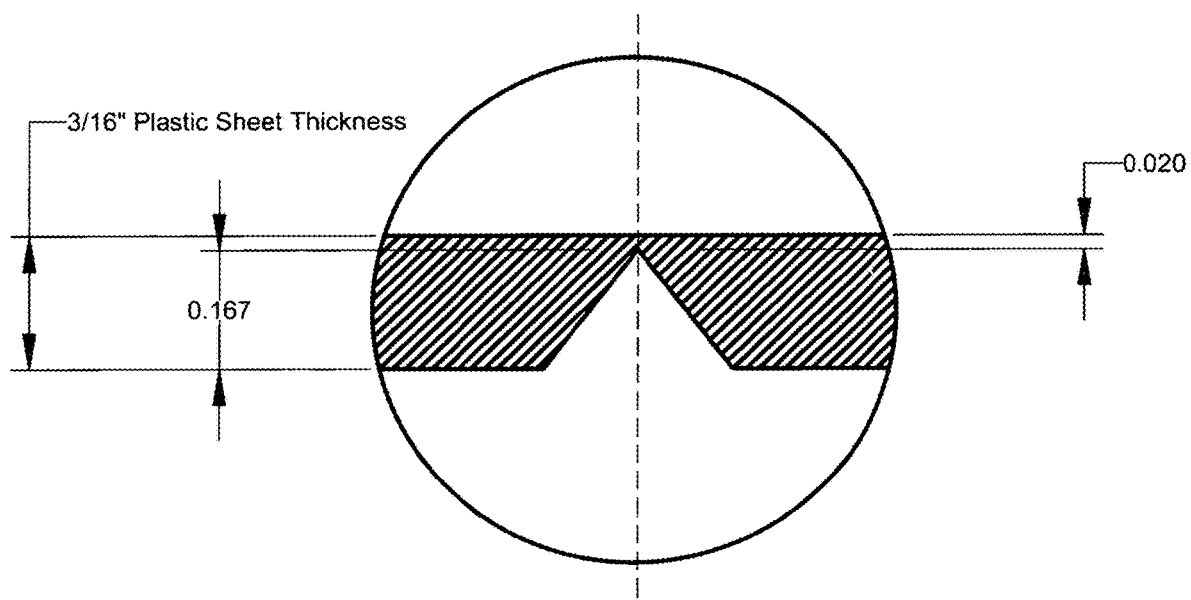
FIG. 14 illustrates an embodiment of another living hinge of the ductless enclosure apparatus.

FIG. 14 illustrates another embodiment of a Living Hinge (Style 2) of the ductless enclosure apparatus 100. In this figure, the living hinge can be a triangular or "V" shaped cut out, which connects the enclosure panels of the housing unit 101 and allows the housing to fold upon itself for storage.

Figure 15:
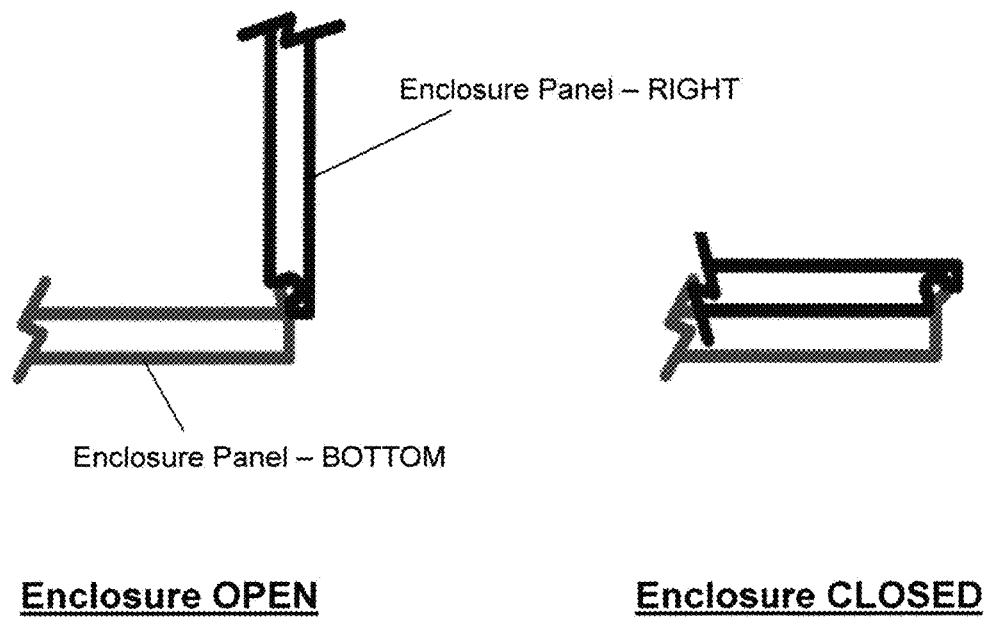
FIG. 15 illustrates an embodiment of a rotating non-living hinge of the ductless enclosure apparatus.

FIG. 15 illustrates an embodiment of a Rotating Hinge (non-living hinge) of the ductless enclosure apparatus 100. In this figure, two enclosure panels of the housing unit 101 are connected via a ball and groove mechanism, which interlocks the two panels when slid into each other.

Figure 16:
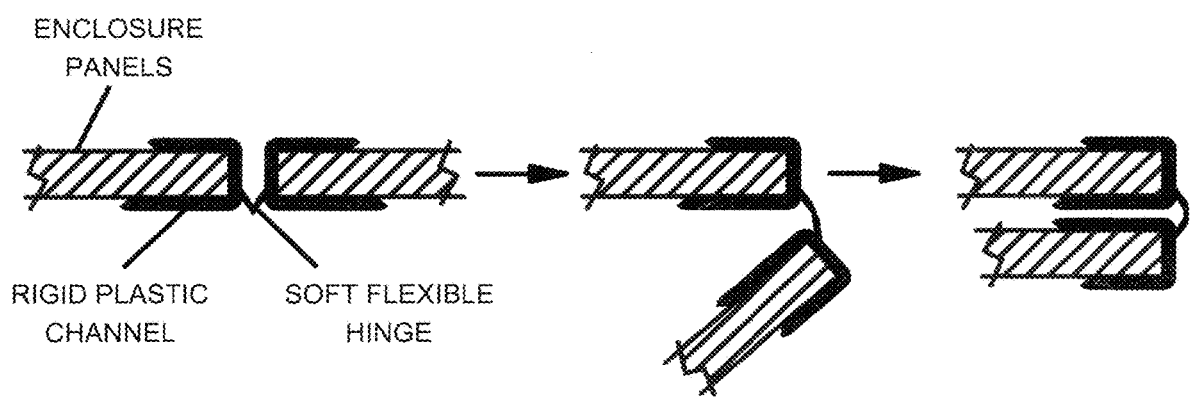
FIG. 16 illustrates a larger view of the embodiment of FIG. 15 above.

FIG. 16 illustrates an embodiment of an another soft flexible living hinge of the ductless enclosure apparatus 100. In this figure, a pre-fabricated double "U" channel made of rigid plastic with a soft rubber like material in the middle section, is used to connect the two enclosure panels of the housing unit 101. Each of the two panels slide into the U channels at both ends.

The models described above can be used in many industries and some are listed below: baking and food; medical; pottery making; manufacturing such as metal fabrication; research and industrial laboratories; photography shops; screen printing; poultry; plant nurseries; nail salons; hobbyist and craft industries, and many others.

It should be readily understood by those persons skilled in the art that the present disclosure is susceptible of a broad utility and application. Many embodiments and adaptations of the present disclosure other than those herein described, as well as many variations, modifications and equivalent arrangements can be apparent from or reasonably suggested by the present disclosure and the foregoing description thereof, without departing from the substance or scope of the present invention. Accordingly, while the present disclosure has been described herein in detail in relation to its embodiments, it is to be understood that this disclosure is only illustrative and exemplary of the present disclosure and is made merely for purposes of providing a full and enabling disclosure of the invention. The foregoing disclosure is not intended or to be construed to limit the present disclosure or otherwise to exclude any such other embodiment, adaptations, variations, modifications and equivalent arrangements, the present disclosure being limited only by the claims appended hereto and the equivalents thereof.

What is claimed is:

1. A foldable ductless enclosure apparatus, comprising: a housing unit including a plurality of enclosure panels, wherein the enclosure panels include a plurality of living or non-living hinges that connect the plurality of enclosure panels, and allows the housing unit to fold to form an enclosure; when the enclosure is formed from the plurality of enclosure panels, the enclosure includes an access opening in a proximal end of the housing unit, a distal end of the housing unit including an exhaust opening, and a work chamber defined by the housing unit; and an air circulation system, including at least one fan with a plurality of blades adjacent the exhaust opening, a plurality of filters in a filtration chamber, said at least one fan and said plurality of filters being located within the work chamber of the enclosure, and the plurality of filters comprising a first pre-filter facing a direction of the work chamber, at least one second filter in the form of at least one MERV or HEPA filter adjacent to the first pre-filter, and an activated carbon filter located adjacent to both the at least one second filter and the at least one fan.

2. The foldable ductless enclosure apparatus of claim 1, wherein contaminated air in the work chamber is driven by the at least one fan through the plurality of filters and through the exhaust opening in the distal end of the housing unit.

3. The foldable ductless enclosure apparatus of claim 1, wherein the housing unit enclosure includes said plurality of living hinges that are made of at least one of: High Density Polyethylene (HDPE) plastic, polypropylene, and polyvinyl chloride (PVC).

4. The foldable ductless enclosure apparatus of claim 1, wherein the plurality of panels are constructed of one solid piece thereby reducing assembly time, eliminating leakage gaps and facilitating set up and tear down of the enclosure apparatus.

5. The foldable ductless enclosure apparatus of claim 1, wherein a water holding filter encased in a plastic box is mounted on a back of the at least one fan to provide the work chamber with moisture through evaporative cooling.

6. The foldable ductless enclosure apparatus of claim 1, wherein a water holding filter encased in a plastic box is mounted on a back of the at least one fan to provide the work chamber with cool air through evaporative cooling.

7. The foldable ductless enclosure apparatus of claim 1, further comprising an adjustable intensity background with white or colored lighting that is remote controlled with an infrared remote control.

8. The foldable ductless enclosure apparatus of claim 1, further comprising a manual turntable and an electric turntable with a speed control hand or foot operated switch.

9. The foldable ductless enclosure apparatus of claim 1, further comprising a plurality of hooks for hanging work pieces and equipment in the work chamber.

10. The foldable ductless enclosure apparatus of claim 1, further comprising an attachable heat intensity controlled heater.

11. The foldable ductless enclosure apparatus of claim 1, further comprising a frontal door to the access opening that attaches magnetically and seals the access opening to the work chamber.

12. The foldable ductless enclosure apparatus of claim 11, further comprising rubber gloves in the frontal door for an operator to manipulate a product in the work chamber.

13. The foldable ductless enclosure apparatus of claim 1, further comprising an air flow sensor.

14. The foldable ductless enclosure apparatus of claim 1, further comprising a switch that reverses a motor polarity and a rotational direction of the fan blades.

15. The foldable ductless enclosure apparatus of claim 1, further comprising a rotational control knob that adjusts a motor speed thereby adjusting delivered air flow from zero to full speed providing maximum air flow.

16. The foldable ductless enclosure apparatus of claim 1, wherein the at least one fan pulls air from the work chamber thereby creating a negative pressure in the work chamber; or pushes air into the work chamber thereby creating a positive pressure in the work chamber.

17. The foldable ductless enclosure apparatus of claim 1, further comprising a separate tray with a liquid drain.

18. The foldable ductless enclosure apparatus of claim 1, further comprising a rotating shaft that is mounted on either or both of two side walls of the enclosure, the rotating shaft comprises a spinning crank on an outside of the enclosure and a user operable adjustable spring or mechanical grip on an inside of the enclosure to hold the part to be painted.

19. The foldable ductless enclosure apparatus of claim 1, wherein the at least one fan is a high efficiency low noise fan for reducing a sound level within the work chamber to minimum levels.

20. The foldable ductless enclosure apparatus of claim 1, wherein the plurality of living hinges that connect the enclosure panels and allow the housing to fold are a circular cut out living hinge or a triangular cut out living hinge.

21. The foldable ductless enclosure apparatus of claim 1, wherein the plurality of non-living hinges that connect the enclosure panels and allow the housing unit to fold are a ball and groove mechanism hinge, which interlock when slid into each other.

22. The foldable ductless enclosure apparatus of claim 1, wherein the plurality of non-living hinges that connect the enclosure panels and allow the housing unit to fold are a U channel made of rigid plastic with a soft rubber like material in a middle section.

23. The foldable ductless enclosure apparatus of claim 1, wherein the plurality of non-living hinges that connect the enclosure panels and allow the housing unit to fold are a soft flexible non-living hinge, which includes two rigid plastic channels.

24. The foldable ductless enclosure apparatus of claim 1, wherein the foldable ductless enclosure apparatus is configured to have use as a paint spray booth; an air brush booth; a fume hood; a clean room; a heating chamber; a dryer; a cooler, a humidifier, a long-term conditioning and aging booth; a de-hydrating booth; a hydrating booth; a cooler; a washout for photography; a sand/bead blasting booth; a clay and pottery booth, a black light chamber; a photography backdrop booth; an incubator; a seedling and plant growing booth; a color sorting booth; a color proof table booth; a projection booth for use as a template; a screen printing booth; a cutting booth; a dusting booth; a sound recording booth, or a steaming booth.

* * * * *